United States Patent [19]

Lahmann

[11] E Re. 30,051

[45] Reissued Jul. 24, 1979

[54] CHOPPER ARRANGEMENT FOR ATOMIC ABSORPTION SPECTROPHOTOMETER

[75] Inventor: Werner K. Lahmann, Uberlingen, Fed. Rep. of Germany

[73] Assignee: Bodenseewerk Perkin-Elmer & Co., GmbH, Uberlingen, Fed. Rep. of Germany

[21] Appl. No.: 819,365

[22] Filed: Jul. 27, 1977

Related U.S. Patent Documents

Reissue of:

[64] Patent No.: 3,901,601
Issued: Aug. 26, 1975
Appl. No.: 435,338
Filed: Jan. 21, 1974

[30] Foreign Application Priority Data

Jan. 25, 1973 [DE] Fed. Rep. of Germany ..... 2303533

[51] Int. Cl.[2] ..... G01J 3/42; G01J 3/08

[52] U.S. Cl. ..... 356/325; 250/233; 350/274; 350/285

[58] Field of Search ..... 350/266, 272–275, 350/285; 356/85–87, 93–95, 97; 250/233

[56] References Cited

U.S. PATENT DOCUMENTS

| | | | |
|---|---|---|---|
| 3,175,092 | 3/1965 | Leftwich | 250/233 |
| 3,334,537 | 8/1967 | Beattie | 356/104 X |
| 3,413,482 | 11/1968 | Ling | 250/226 |
| 3,542,480 | 11/1970 | Ford | 356/97 X |
| 3,689,158 | 9/1972 | Shifrin | 356/87 |

FOREIGN PATENT DOCUMENTS 1911048 10/1969 Fed. Rep. of Germany .

OTHER PUBLICATIONS

Woodriff et al., *Applied Spectroscopy*, vol. 24, No. 5, Sep./Oct. 1970, pp. 530–533.
Woodriff et al., *Applied Spectroscopy*, vol. 27, No. 3, May/Jun. 1973, pp. 181–185.
Dick et al., *Applied Spectroscopy*, vol. 27, No. 6, Nov./-Dec. 1973, pp. 467–470.
Kahn et al., *Applied Optics*, vol. 2, No. 9, Sep. 1963, pp. 931–936.

*Primary Examiner*—F. L. Evans
*Attorney, Agent, or Firm*—Salvatore A. Giarratana; Francis L. Masselle; Edwin T. Grimes

[57] ABSTRACT

An atomic absorption spectrophotometer incorporating discrimination against "background" absorption, i.e., absorption not caused by the resonant line absorption by the element being measured. The device includes a resonant line emitting source (e.g., a hollow cathode lamp) and a continuous spectrum light source (e.g., a deuterium lamp), a monochromator and a detector system. The improvement comprises a specific chopper arrangement which sequentially causes: (a) the resonant line light from the hollow cathode lamp to go to the sample path, (b) this light to go to the reference path, (c) the continuous spectrum light from the deuterium lamp to go to the reference path, and finally (d) the continuous spectrum light to go to the sample path. By comparing the light intensities during intervals (c) and (d) the effect of the background absorption can be determined and compensated for so as to determine the relationship between (a) and (b) free of the effect of such background absorption. The specific improvement includes a sector mirror and disk-shaped mask which are conjointly rotated in the angularly intersecting paths of the radiation from the cathode lamp and the deuterium lamp.

11 Claims, 3 Drawing Figures

CHOPPER ARRANGEMENT FOR ATOMIC ABSORPTION SPECTROPHOTOMETER

Matter enclosed in heavy brackets [ ] appears in the original patent but forms no part of this reissue specification; matter printed in italics indicates the additions made by reissue.

FIELD OF THE INVENTION

This invention relates to an atomic absorption spectrophotometer in the form of a "double-beam" instrument having a sample beam path passing through an atomized sample substance and a reference beam path. More particularly, the invention relates to double-beam instruments which include a light source for emitting a resonance line of the desired to be measured element of interest; a second light source emitting a continuous spectrum; and a chopper arrangement by which in predetermined cyclical sequence (in four successive intervals) light from the line-emitting first light source is directed alternately to the sample and reference paths and during other intervals light from the continuous spectrum light source is alternately directed to the sample and reference paths.

PRIOR ART

In atomic absorption spectrometry a sample substance is brought into a substantially atomic state, for instance, by spraying it into a flame. The sample substance thus brought into an atomic state has passed therethrough a sample light beam which originates from a line-emitting light source, including a resonance line of an element in the sample substance desired to be measured. A narrow band of wavelengths including the resonance line is selectively passed by means of a monochromator and caused to impinge upon a detector. The desired (to be measured) element in the sample substance specifically absorbs the resonance line which theoretically at least is not absorbed by the other elements in the sample substance. Thus, the absorption degree of the sample beam of light is representative of the amount of the wanted element in the sample substance.

In order to take into account changes in the lamp brightness and changes in the sensitivity of the detector, a double-beam instrument is generally utilized; in such an instrument the beam of light originating from the spectral light source is alternately directed across a sample path which passes through the atomized sample substance and across a reference path which bypasses the atomized sample. The sample and reference beams are then directed (alternately) onto a common detector. The detector signals are demodulated and an output signal is generated which is a function of the relation of the signal proportions originating from the sample and reference light beams. See, for example, Kahn and Slavin. "An Atomic Absorption Spectrophotometer" in Applied Optics, 1963, pages 931–936).

The assumption that the resonance line of the desired element is absorbed or attenuated only by that element, so that the intensity of the sample beam in relation to the intensity of the reference beam is an accurate and definite measure of the amount of the element of interest, does not necessarily apply in practice. A "background absorption" often occurs which can be caused by molecular absorption, absorption due to the solvent of the sample solution or by scattering, caresed for instance, by salt crystals. This background absorption may falsify the measured value obtained by the atomic absorption spectrophotometer to a considerable extent.

It is known in the prior art to compensate for this background absorption (DT-OS 1,911,048 and DT-OS 2,207,298). Such compensation is based on the fact that the background absorption is a quantity which changes relatively slowly with the wavelength in contrast to the absorption (at a single wavelength) of the resonance line by the element being measured. Therefore, the background absorption can be measured by using light from a source supplying a continuous spectrum. The monochromator selects a narrow range of wavelengths of the continuous spectrum which contains the resonance line of the desired element. This wavelength range is also subjected to the background absorption which can be considered substantially constant across the whole range. The absorption to which this continuous radiation is subjected in the small range of the narrow resonance line by the atoms of the element of interest can be practically neglected as compared with the total absorption in the substantially wider wavelength range. By a comparison of the sample beam intensity which results for the selected wavelength range of the continuous spectrum with the intensity of the beam in the reference path, the background absorption can be determined. This background absorption can then be compensated for or mathematically utilized during the signal analysis.

Therefore, prior art background absorption compensating atomic absorption spectrophotometers have two light sources, that is, a line-emitting light source (which is conventionally constituted by a hollow cathode lamp), and a light source supplying a continuous spectrum, (for instance a deuterium lamp). For double beam background compensation, a chopper arrangement must be provided so that in a fixed sequence of four successive intervals the light of each of the light sources is directed on the one hand along the sample path of rays and on the other hand along the reference path of rays.

In a prior art system (DT-OS 1,911,048 corresponding to U.S. patent application Ser. No. 710,802 filed Mar. 6, 1968 and now abandoned), a chopper arrangement comprises a rotating sector mirror by which the beams of light originating from a hollow cathode lamp and a deuterium gas discharge lamp are alternately directed into the sample path. However the instrument, although originally a double-beam spectrophotometer, is used only as a single beam spectrophotometer in this background absorption compensation mode. In particular an auxiliary shutter blocks the reference path continuously when the two light sources and rotating sector mirror chopper are utilized.

SUMMARY OF THE INVENTION

It is an object of this invention to provide a mechanically simple chopper arrangement for atomic absorption spectrophotometers of the double-beam type for providing double-beam background absorption compensation. In particular the chopper arrangement passes radiation from each of the spectral line source and the continuous spectrum source to each of the sample and reference paths in four separate time intervals.

It is another object of this invention to so devise an arrangement of this type wherein the light sources are arranged in a readily accessible manner and are imaged by substantially similar paths of rays so that in the sample and reference beam paths substantially geometrically identical beams from the two light sources are alternatingly obtained.

According to the invention this object is attained by a chopper arrangement which includes a sector mirror as well as a mask rotating coaxially and synchronously therewith. The sector mirror has two reflecting sectors arranged on its opposite sides and has two light-transmitting cutout portions. The mask has two partially masking portions consisting respectively of an arcuate aperture and a cutout portion, each of different radii and each extending across one transmitting cutout portion of the sector mirror. In addition the mask has an open sector in the range of the reflecting sector which faces the mask. The beams of light from the first and the second light sources obliquely impinge in a substantially symmetrical way upon the sector mirror in the range of the reflecting sectors; one of the partially transmitting portions of the mask (e.g. its arcuate aperture) and its other partially transmitting portion (e.g., the cutout portion) transmit, respectively, the sample and the reference beams.

Then, on the other hand, from the "front" reflecting sector of the sector mirror the light from the one light source, for instance, the line-emitting hollow cathode lamp is reflected for instance into the sample path. In another position the light from the hollow cathode lamp is transmitted through a transmitting portion of the sector mirror and the cutout portion at the rim of the mask into the reference path. The beam of light from the other light source emitting a continuous spectrum, for instance a deuterium lamp, impinging upon the mask radially inwardly of the cutout thereof, is interrupted by the mask and in this position cannot pass through the cutout portion of the sector mirror into the sample path. In another (third) position of the sector mirror and of the mask, the light from the deuterium lamp passes through the completely open sector of the mask and is reflected back therethrough by the reflecting sector arranged on the "back" of the sector mirror into the reference path. In a further (fourth) position of the sector mirror the beam of light from the deuterium lamp passes through the inner arcuate aperture of the mask and through the transmitting portion of the sector mirror into the sample path, whereas conversely the light from the hollow cathode lamp is blocked from the reference path at this time by the non-transmitting rim of the mask. The mask is arranged at such a distance behind the sector mirror that the cross-section of the beam of light from the deuterium lamp and the cross-section of the reference beam path are discretely separated (i.e., in a non-overlapping manner) in the plane of the mask and are thus separately controllable by the mask. In this manner a highly simple assembly is obtained. It is not necessary to arrange one light source between the sector mirror and the mask, so that beams of light originating from both light sources can be generated in substantially identical geometrical and optical paths by conventional means.

Figure 1:
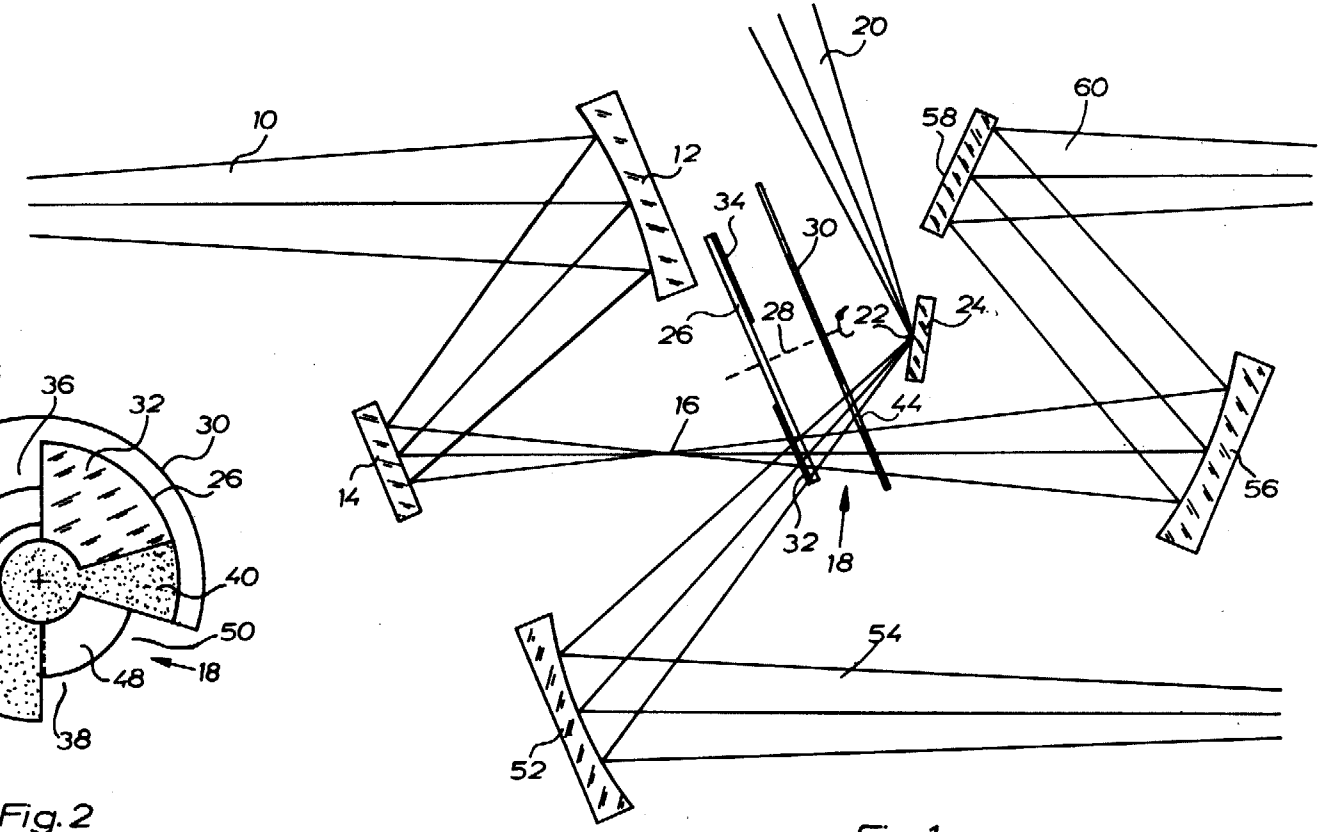
FIG. 1 illustrates the path of rays as determined by the chopper arrangement according to this invention.

In the embodiment according to FIG. 1, a beam of light 10 originating from a hollow cathode lamp (not shown) is focused by means of a concave mirror 12 via a plane mirror 14 to a point 16 in the vicinity of a chopper arrangement 18. A beam of light 20 which originates from a light source (not illustrated) such as a deuterium lamp emitting a continuous spectrum is focused by optical elements (also not illustrated) at the point 22 on a deflecting mirror 24 which then reflects the beam onto the chopper arrangement 18.

The chopper arrangement 18 contains a sector mirror 26 and a mask 30 rotating rigidly with the sector mirror about the same axis 28. The mask 30 is arranged a spaced distance from the sector mirror 26, specifically on its "rear" side from which it is approached by the beam of light 20 originating from the deuterium lamp. The two points 16 and 22 in which the beams of light 10 and 20 are focused are disposed symmetrically with respect to each other as related to reflection of the beam 20 by the sector mirror in a plane containing the axis of rotation 28 of the chopper arrangement 18, wherein the beam axes are inclined with respect to the normal to the surface of the sector mirror 26 in the direction towards the axis of rotation 28. The cross-sections of the beams of light 10 and 20 coincide in the plane of the sector mirror 26 so as to be substantially equal in size (and shape).

Figure 2:
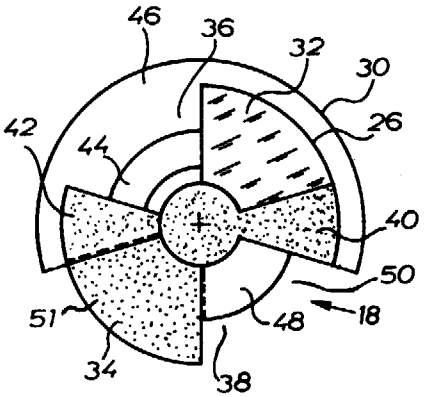
FIG. 2 is a front view of the chopper assembly showing the sector mirror mask.

The sector mirror 26 contains two reflecting sectors 32 and 34 each extending for approximately slightly less than 90° (compare FIGS. 1 and 2). The reflecting sectors 32 and 34 are arranged diametrically opposite each other with respect to the axis of rotation 28. The reflecting sector 32 is arranged on the side facing the hollow cathode lamp (the front side of the sector) so that it reflects the beam of light 10. The reflecting sector 34 is mounted on the other (back) side of the sector mirror 26 facing the deuterium lamp and the mask 30, and sector 34 reflects the beam of light 20. Between the reflecting sectors 32 and 34 the sector mirror 26 has completely transmitting or cutout portions 36 and 38 which extend for approximately 90°. Between the reflecting sector 32 and the cutout portion 38 and between the reflecting sector 34 and the cutout portion 36 absorbing sectors 40 and 42, respectively, each for generating a dark signal, are provided on the reflecting side of the respective reflecting sector.

The mask 30, in the sector of the transmitting cutout portion 36, has an arcuate aperture 44 which has its radial distance from the axis 28 corresponding to the intersection point of the beam 20 through the plane of the mask 30 (see FIG. 1). Outside of this aperture 44, the mask 30 has a nontransmitting rim or peripheral portion 46. On the other hand, in the range of the transmitting cutout portion 38 of the sector mirror 26 there is provided a non-transmitting central portion 48 in the area of the intersection point of the beam 20 and outwardly thereof a cutout portion 50. In the range of the reflecting sector 34 the mask 30 has a completely open cutout portion 51.

The described arrangement operates as follows. When the reflecting sector 32 is in the lower position in FIG. 1 the beam of light 10 is reflected therefrom. It is then collected by a concave mirror 52 and is directed into a sample path 54 (which goes to the atomic absorption sample). The beam of light 20 is masked at this time by the mask 30. After about a 90° rotation of the chopper arrangement 18 (counter-clockwise as seen in FIG. 2) the cutout portion 38 is at the bottom as seen in FIG.

1, and the beam of light 10 is transmitted through the sector mirror 26, passes through the peripheral cutout portion 50 of the mask 30 and is collected by a concave mirror 56. The beam of light thus collected is directed into a reference path 60 by means of a deflecting mirror 58. However, the beam of light 20 is masked by the central absorbing portion 48 of the mask 30 and cannot pass into the sample path through the cutout portion 38. After another 90° rotation of the sector mirror 26 in a counter-clockwise direction in FIG. 2, the beam of light 20 impinges upon the reflecting (back) sector 34 through the cutout portion 51 of the mask and is reflected by the same into the reference path 60; at this time the opaque and absorbing other (front) surface of the sector 34 blocks the beam 10 from going to either of the paths. In the last position of the sector mirror 26, the beam of light 20 passes through the arcuate aperture 44 (as shown in FIG. 1) and the cutout portion 36 of the sector mirror into the sample path 54. The beam of light 10 passing through the cutout portion 36 is interrupted by the marginal portion 46 of the mask so that it cannot pass into the reference path when the chopper is in this position.

Thus, with the described chopper arrangement the following switching sequence is obtained:

a. beam of light 10 from the hollow cathode lamp goes to the sample path;
b. beam of light 10 goes to the reference path;
c. beam of light 20 goes to the reference path;
d. beam of light 20 goes to sample path.

Therebetween, due to the absorbing sectors 40 and 42, respectively and the mask 30, dark signals are respectively obtained, specifically at the end of (a) and at the end of (c) above.

The arrangement would also function in an analogous manner if in FIG. 1 the light sources and/or sample and reference paths of rays were interchanged. It would also be possible to change the angular arrangement (i.e., the circular order) of the sectors to each other provided the association of the respective sectors of the sector mirror and the mask is maintained. This would only lead to a change in the above stated switching sequence.

Figure 3:
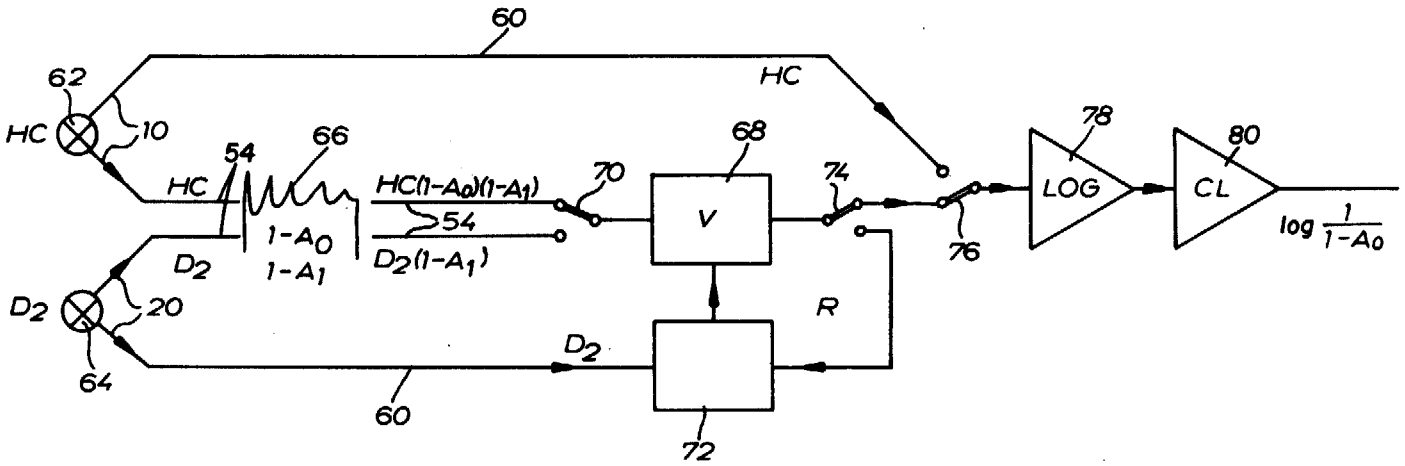
FIG. 3 is a block diagram of the signal analyzing arrangement.

FIG. 3 illustrates schematically the processing of the obtained signals. Reference numeral 62 designates the line-emitting hollow cathode lamp, and reference numeral 64 designates the deuterium lamp emitting a continuous spectrum. The beams of light 10 and 20 are supplied alternately to the sample and reference paths 54 and 60, respectively, in the above stated switching sequence, a flame 66 (for atomizing the sample) being arranged in the sample path 54. The beam of light 10 is attenuated by the flame 66 by the factor $(1-A_0)(1-A_1)$, $A_0$ being the absorption of the resonance line by the wanted element in the flame 66 and $A_1$ the attentuation by the background absorption. The beam of light 20 is essentially only subjected to an attenuation caused by the background absorption by the factor $(1-A_1)$.

The signals of the detector (not shown) are phase-sensitively demodulated into the four intervals (a) to (d) above and are therefore separately available. The signals from the sample path 54 are amplified by means of an variable gain amplifier 68 to which they are applied via a controlled switch 70 during the intervals (a) and (d).

During the intervals (c) and (d) a comparator-controller 72 compares the signal from the deuterium lamp 64 in the reference path 60 with the output of the amplifier 68 which, for this purpose connects to the controller input during the interval (d) via a controlled switch 74, and controls the gain of the amplifier 68 accordingly (i.e. to make these signals equal). Thus, by varying the gain of amplifier 68, the absorption loss due to background absorption is compensated, i.e., the amplifier 68 amplifiers the amplifies by a factor $$\frac{1}{1-A_1}$$

During the interval (a), switch 74 applies the amplifier output signal, which is proportional to:

$$I_{10}(1-A_0)(1-A_1)\frac{1}{1-A_1}=I_{10}(1-A_0)$$

(where $I_{10}$, is the original intensity of beam 10) to another controlled switch 76, which connects the signal to a logarithmic amplifier 78. During the interval (b) the switch 76 connects the unattenuated signal originating from the beam of light 10 when passing through the reference path of rays (which signal is at least proportional to $I_{10}$) to the logarithmic amplifier 78. The output of the amplifier 78 is amplified once more by a d.c. amplifier 80 and supplies a signal proportional to:

$$\log\frac{1}{1-A_0}$$

independently of $I_{10}$, detector sensitivity or background absorption.

A practically favorable construction consists in making the sector mirror 26 in the form of a disk-shaped carrier of light-transitting material on which the reflecting sectors 32 and 34 are mounted as oppositely reflecting layers, and that these reflecting layers are covered on the other side by an absorbing layer. The mask carrier 30 may be a circular thin disk having appropriate opaque and absorbing portions, the "aperture" or "cutout portion", 44 and 50, respectively, and the entirely "open" portion 51 being merely transparent portions of the disk. The disk should be very thin in order to keep adjusting errors small.

What is claimed is:

1. In a double-beam atomic absorption spectrophotometer having a sample beam path passing through an atomized sample substance and a reference beam path, including a line-emitting first light source which emits a resonance line of an element of interest desired to be measured and a second light source emitting a continuous spectrum, a monochromator for selecting a limited spectral range containing the said resonance line from the entire continuous spectrum, a detector impinged upon by the sample and reference beams of light, and a signal analyzer circuit connected to generate an output signal from the detector corrected with respect to the background absorption, a chopper arrangement by which, in a predetermined cyclical sequence of four successive intervals, light from the line emitting first light source is directed to the sample and reference paths and light from the continuous spectrum second light source is similarly directed to the sample and reference paths, said chopper arrangement comprising:

a sector mirror and an opaque mask rotating coaxially and conjointly therewith;

said sector mirror having two angularly spaced reflecting sectors, arranged respectively on its opposite faces and, angularly interposed between said sectors, a pair of light-transmitting cutout portions;

said mask comprising two partially cutout portions, including an arcuate aperture and a cutout portion of different radii, extending across a respective one of the transmitting cutout portions of the sector mirror, and a completely open sector in aligned position with the reflecting sector on the side facing the mask;

and means for causing the beams of light from the first and the second light source to impinge obliquely upon said second mirror substantially reflectingly symmetrically to the sector mirror in the range of the reflecting sectors, so that one of said partially cutout portions of the mask passes one of the beams of light impinging thereon and the other passes the other beam of light to the sample path and the reference path during intervals when transmitting cutout portions of said sector mirror allow the beams of light [of] *to* pass through said sector mirror.

2. An atomic absorption spectrophotometer as claimed in the claim 1, in which:

said reflecting sectors (32,34) of said sector mirror are diametrically opposite each other with respect to the axis of rotation (28) and said light-transmitting cutout portions (36,38) are interposed therebetween.

3. An atomic absorption spectrophotometer as claimed in claim 2, in which:

the reflecting sectors of the sector mirror are symmetrically disposed with respect to a first diametral line normal to said axis of rotation and the light-transmitting cutout portions are symmetrically disposed with respect to a second diametral line normal to the first diametral line and to the axis of rotation.

4. An atomic absorption spectrophotometer as claimed in the claim 2, in which:

both of the beam axes of the two beams of light (10,20) impinging upon the sector mirror from the first and second light source, respectively, are in a plane containing the axis of rotation (28) of the chopper arrangement (18) and are inclined towards this axis of rotation (28) with respect to the surface normal.

5. An atomic absorption spectrophotometer as claimed in claim 4, in which:

said arcuate shaped aperture (44) of said mask (30) extends angularly across the one cutout portion (36) of the sector mirror (26) in the radial range of the point of intersection of the beam of light (20) on the side of the mask through the plane of the mask (30);

a cutout portion (50) at the periphery of said mask is in the radial range of the point of intersection of the beam of light (20) reflected on the reflecting sector (34) on the side of the mask though the plane of the mask (30) which angularly extends across the other cutout portion (38) of the sector mirror (26), and said completely open portion (51) extends radially across both points of intersection and is angularly aligned with the mirror (34) on the sector on the side of the mask.

6. An atomic absorption spectrophotometer as claimed in claim 5, in which:

at the edges of the reflecting sectors (32,34) there are provided absorbing sectors (40,42) for generating a dark signal each.

7. An atomic absorption spectrophotometer as claimed in claim 2, in which:

said sector mirror (26) comprises a disk-shaped carrier of light-transmitting material on which the reflecting sectors (32,34) are applied as bilaterally reflecting layers, and that these reflecting layers are covered on one respective side each by an absorbing layer.

8. An atomic absorption spectrophotometer as claimed in the claim 7, in which said mask comprises a thin circular disk.

*9. In a double-beam spectrophotometer optical testing system having a sample beam path passing through a sample substance and a reference beam path, including a line-emitting first light source which emits a resonance line of an element of interest desired to be measured and a second light source emitting a continuous spectrum, a monochromator for selecting a limited spectral range containing the resonance line from the entire continuous spectrum, a detector impinged upon by the sample and reference beams of light and a signal analyzer circuit connected to generate an output signal from the detector corrected with respect to the background absorption,*

*a chopper arrangement by which, in a predetermined cyclical sequence of four successive intervals, light from the line emitting first light source is directed to the sample and reference paths and light from the continuous spectrum light source is similarly directed to the sample and reference paths,*

*said chopper arrangement comprising:*

*two disc-like elements having a common axis and being mounted in offset relationship along their common axis and being rotatable coaxially and conjointly, each of said disc-like elements being mounted so as to be rotatable through each of said beam paths;*

*one of said elements having a light transmissive portion and a reflecting portion positioned to periodically, alternately pass and reflect said beams of light;*

*the other of said elements having a light transmissive portion and a light blocking portion positioned to periodically, alternately pass and block one of said beams of light.*

*10. A spectrophotometer according to claim 9 wherein said spectrophotometer is a double-beam atomic absorption spectrophotometer and wherein said sample beam path passes through an atomized sample substance.*

*11. An atomic absorption spectrophotometer according to claim 10 wherein said light transmissive portions are cutout portions for allowing the beams of light to pass therethrough.*

* * * * *